United States Patent

Henton

Patent Number: 5,878,396
Date of Patent: Mar. 2, 1999

[54] METHOD AND APPARATUS FOR SYNTHETIC SPEECH IN FACIAL ANIMATION

[75] Inventor: Caroline G. Henton, Santa Cruz, Calif.

[73] Assignee: Apple Computer, Inc., Cupertino, Calif.

[21] Appl. No.: 19,514

[22] Filed: Feb. 5, 1998

Related U.S. Application Data

[63] Continuation of Ser. No. 6,881, Jan. 21, 1993, abandoned.

[51] Int. Cl.$^6$ .......................................... G10L 3/00
[52] U.S. Cl. ........................ 704/276; 704/270; 704/235
[58] Field of Search .................................. 704/270, 276, 704/235

[56] References Cited

U.S. PATENT DOCUMENTS

5,608,839  3/1997  Chen ...................................... 395/2.44
5,657,426  8/1997  Waters et al. ........................... 395/2.85

Primary Examiner—David R. Hudspeth
Assistant Examiner—Michael N. Opsasnick
Attorney, Agent, or Firm—Carr & Ferrell LLP

[57] ABSTRACT

The present invention utilizes a novel approach to facial imaging synchronized with synthetic speech. Mapping viseme images to a diphone requires the same 'transitioning' in that the imaging associated with a diphone is not a static image, but rather, a series of images which dynamically depict, with lip, teeth and tongue positioning, the sound transition occurring in the relevant diphone. Each series of lip, teeth, and tongue positioning transitions is referred to herein as a 'diseme.' A diseme (like a diphone) thus begins somewhere during one viseme (phone) and ends somewhere during a following viseme (phone). Due to lip, teeth and tongue position imaging commonality, phones are grouped into archiphonic families. A single diseme, which depicts the transition from a phone in one archiphonic family to another phone in a different archiphonic family, can be used for displaying the transition between any phone in the first archiphonic family to any phone in the second archiphonic family. In this way, the approximately 1800 diphones in General American English can be visually depicted by a relatively small number of disemes, again, due to their similarity in lip, teeth, and tongue image positioning. This results in a mapping between synthetic speech and facial imaging which more accurately reflects the speech transitional movements of a realistic speaker image.

8 Claims, 6 Drawing Sheets

METHOD AND APPARATUS FOR SYNTHETIC SPEECH IN FACIAL ANIMATION

CROSS-REFERENCE TO RELATED APPLICATIONS

This is a continuation of application Ser. No. 08/006,881, filed on Jan. 21, 1993, abandoned.

This application is related to co-pending patent application having Ser. No. 08/007,297, entitled "METHOD AND APPARATUS FOR DIPHONE ALIASING" having the same inventive entity, assigned to the assignee of the present application, and filed with the United States Patent and Trademark Office on the same day as the present application.

FIELD OF THE INVENTION

The present invention relates generally to the synthesis of human speech. More specifically, the present invention relates to electronic speech synthesis using pre-recorded segments of human speech to fill in for other missing segments of human speech and relates to facial animation synchronized to the human speech.

BACKGROUND OF THE INVENTION

Re-creation or synthesis of human speech has been an objective for many years and has been discussed in serious texts as well as in science fiction writings. Human speech, like many other natural human abilities such as sight or hearing, is a fairly complicated function. Synthesizing human speech is therefore far from a simple matter.

Various approaches have been taken to synthesize human speech. One approach is known as parametric. Parametric synthesis of human speech uses mathematical models to recreate a desired sound. For each desired sound, a mathematical model or function is used to generate that sound. Thus, other than possibly in the creation of the underlying mathematical models, parametric synthesis of human speech is completely devoid of any original human speech input.

Another approach to human speech synthesis is known as concatenative. Concatenative synthesis of human speech is based on recording samples of real human speech. Concatenative speech synthesis then breaks down the pre-recorded original human speech into segments and generates novel speech utterances by linking these speech segments to build syllables, words, or phrases. The size of the pre-recorded speech segments may vary from diphones, to demi-syllables, to whole words.

Various approaches to segmenting the recorded original human voice have been used in concatenative speech synthesis. One approach is to break the real human voice down into basic units of contrastive sound. These basic units of contrastive sound are commonly known in the art of the present invention as phones or phonemes.

It is generally agreed that in General American English (a variety of American English that has no strong regional accent, and is typified by Californian, or West Coast American English), there are approximately 40 phones. Note that this number may vary slightly, depending upon one's theoretical orientation, and according to the quality level of synthesis desired. Thus, to synthesize high quality speech, a few sounds may be added to the basic set of 40 phones. In the preferred embodiment of the present invention, there are a total of 50 phones (see Appendix A) used. Again, these 50 phones consist of real human speech pitch-period waveform data samples.

However, generating human speech of a quality acceptable to the human ear requires more than merely concatenating together again the phones which have been excised from real human speech. Such a technique would produce unacceptably choppy speech because the areas of most sensitive acoustic information have been sliced, and rule-based recombination at these points will not preserve the fine structure of the acoustic patterns, in the time and frequency domains, with adequate fidelity.

A better, and commonly used, approach is therefore to slice up the real original human speech at areas of relative constancy. These areas of relative constancy occur, for example, during the steady state (middle) portion of a vowel, at the midway point of a nasal, before the burst portion of a stop consonant, etc. In order to concatenate human speech phones at these points or areas of relative constancy, segments known as diphones have been created that are composed of the transition between one sound and an adjacent sound. In other words, a diphone is comprised of a sound that starts in the center of one phone and ends in the center of a neighboring phone. Thus, diphones preserve the transition between sounds. Note that the second half of one diphone and the first half of a following diphone (each known as a 'demi-diphone') is, therefore, frequently the physical equivalent of a phone.

To produce a diphone, two successive phones or sounds are sliced at their approximate midpoints and appended together. For example, the four different phones within the word 'cat' are [SIL], [k], [AE], and [t]. Therefore, the four sets of two demi-diphones (each comprising roughly one half of a phone), or diphones, used for the word 'cat' are: 1. [SIL] to [k]; 2. [k] to [AE]; 3. [AE] to [t]; and 4. [t] to [SIL].

In human speech it is possible, generally speaking, to make a transition from any phone to any other phone. Having 50 possible phones for General American English yields a matrix or table of 2500 possible diphone samples. Again, each of these diphone samples is thus comprised of the ending portion of one phone and the beginning portion of another phone.

Of course, there are many diphones that never occur in General American English. Two such sounds are: 1) SIL-NG, because no English word begins with a velar nasal, such as occurs at the end of 'sing' (sIHNG); and 2) UH-EH, because no English word or syllable ends with the lax vowel UH, such as occurs in 'put' (pUHt). Thus, if all the diphone data needed to handle all possible transitions from one General American English sound to another were sampled, the actual number of required samples would only be approximately 1800.

Of course, accurately recording 1800 different diphones requires a concerted effort. Situations have occurred where real human speech samples were taken only to later find out that some of the necessary diphones were missed. This lack of all necessary diphones results in less than acceptable sound synthesis quality.

What has been done in the prior art is to replace missing diphones with recorded diphones that are somewhat similar in sound (referred to in the art as 'aliasing'). Take the case of the missing diphone [k] to [AE] (again, as occurs in the word 'cat'). Possibly the ending portion of the phone [k] from the demi-diphone which begins the diphone [k] to [EH] (as occurs in the word 'kettle') could be used as a beginning portion for the missing diphone. And possibly the beginning portion of the phone [AE] from the demi-diphone ending of the diphone [KX] to [AE] (as occurs in the word 'scat') could be used as the ending portion for the missing diphone.

Then, the combination of these two demi-diphone portions could be used to fill in for the missing [k] to [AE] diphone. Thus, what has been done in the prior art is to alias demi-diphones for each half of a missing diphone. However, in the prior art, replacing missing diphones with existing sampled diphones (or two demi-diphones) was done in a haphazard, non-scientific way. The prior art aliasing thus usually resulted in the missing diphones (which were subsequently aliased to stored diphones or demi-diphones) lacking the natural sound of real human voice, an obviously undesirable result in a human speech synthesis system.

Because no formalized aliasing approach is known to exist in the art, prior art text-to-speech or speech sound synthesis systems which did not include samples of all necessary diphones lacked the natural sound of a real human voice. The present invention overcomes this limitation in the prior art by setting forth such a formalized aliasing approach.

The formalized aliasing approach of the present invention thus overcomes the ad hoc aliasing approach of the prior art which oftentimes generated less than satisfactory speech synthesis sound output. Further, storing 1800 different diphone samples can consume a considerable amount of memory (approximately 3 megabytes). In memory limited situations, it may not be feasible or desirable to store all of the needed diphones. Therefore, the formalized aliasing approach of the present invention can also be used to lessen storage requirements for speech sound samples by only storing as many sound samples as memory capacity can support and utilizing the structured aliasing approach of the present invention to provide the needed sounds which are not stored.

Figure 3:
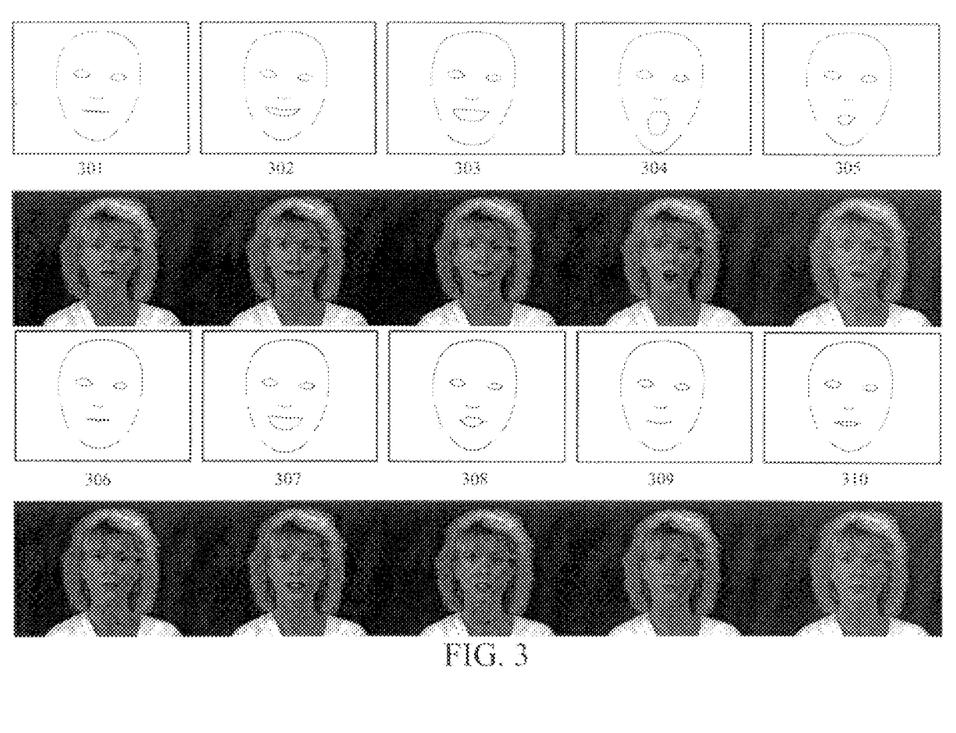
FIG. 3 shows 10 visemes with associated line drawings depicting the most salient features.

Further, the uses of synthetic speech range from simple sound output to animation and 'intelligent' assistants which appear on a display device to instruct the user or to tell the user about some event. In order to make the animation seem life-like, the sound output and the facial movements must be synchronized. Prior art techniques for creating synchronized lip animation so that facial images appear to 'speak,' i.e. articulate their lips, tongue and teeth, in synchrony with a recorded sound track has been to use a limited set of 'visemes.' A viseme is a minimal contrastive unit of visible articulation of speech sounds, i.e. a distinctive, isolated, and stationary articulatory position typically associated with a specific phone. Of course, for certain visemes, tongue and teeth image position is also relevant. An example set of visemes, along with a line drawing highlighting the most salient features of each, can be seen in FIG. 3.

In the prior art, when using visemes in conjunction with General American English, the number of visemes typically ranged from 9 to 32. This is in contrast to the approximately 40 (or 50, as explained herein) basic units of contrastive sounds, or phones, used in General American English. Phones (or phonemes) are the units in the speech domain which may be thought to parallel visemes in the visual domain, because both are minimal contrastive units, and both represent distinctive, isolated units in a theoretical set.

Further, in the prior art, in order to synchronize the phones to the visemes in a synthetic speech system, a mapping was made between the sound being generated and the image being displayed. This was done by mapping one viseme to each of the 40 or 50 phones and then, as the sound transitioned between phones the displayed image transitioned between the associated visemes.

However, as has already been explained herein, phones have not been found to be the best approach in producing high-quality synthesized speech from concatenative units. This is, again, due to the unacceptably choppy speech caused by trying to recombine phones at the areas of most sensitive acoustic information. Instead, diphones (made up of portions of phones which have been combined at their areas of relative constancy) have been used in the prior art. A similar problem results from merely trying to animate from one viseme to another viseme. The resulting image does not accurately reflect the facial imaging which occurs when a human speaker makes the same vocal or sound transition. Thus, what is needed is a mapping between synthetic speech and facial imaging which more accurately reflects the speech transitional movements for a realistic speaker image.

SUMMARY AND OBJECTS OF THE INVENTION

It is an object of the present invention to provide a formalized approach to aliasing of phonetic symbols.

It is a further object of the present invention to provide a formalized approach to aliasing of phonetic symbols thus allowing a voice table with missing phonetic symbols to provide synthetic speech in an aesthetically pleasing manner.

It is a still further object of the present invention to provide a reduced size voice table with a formalized approach to aliasing of phonetic symbols.

It is an even further object of the present invention to provide synthetic speech synchronized with facial animation.

It is still an even further object of the present invention to provide synthetic speech synchronized with facial animation such that the relationship between the synthetic speech and the facial animation accurately reflects the speech transitional movements for a realistic speaker image.

The foregoing and other advantages are provided by a method for synchronizing facial images to synthetic speech comprising storing a sequence of facial images from a viseme in a first archiphonic group to a viseme in a second archiphonic group and displaying the sequence of facial images from the viseme in the first archiphonic group to the viseme in the second archiphonic group if a phone from the first archiphonic group is followed by a phone from the second archiphonic group in the synthetic speech.

The foregoing and other advantages are also provided by an apparatus for synchronizing facial images to synthetic speech comprising a means for storing a sequence of facial images from a viseme in a first archiphonic group to a viseme in a second archiphonic group and a means for displaying the sequence of facial images from the viseme in the first archiphonic group to the viseme in the second archiphonic group if a phone from the first archiphonic group is followed by a phone from the second archiphonic group in the synthetic speech.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

Figure 1:
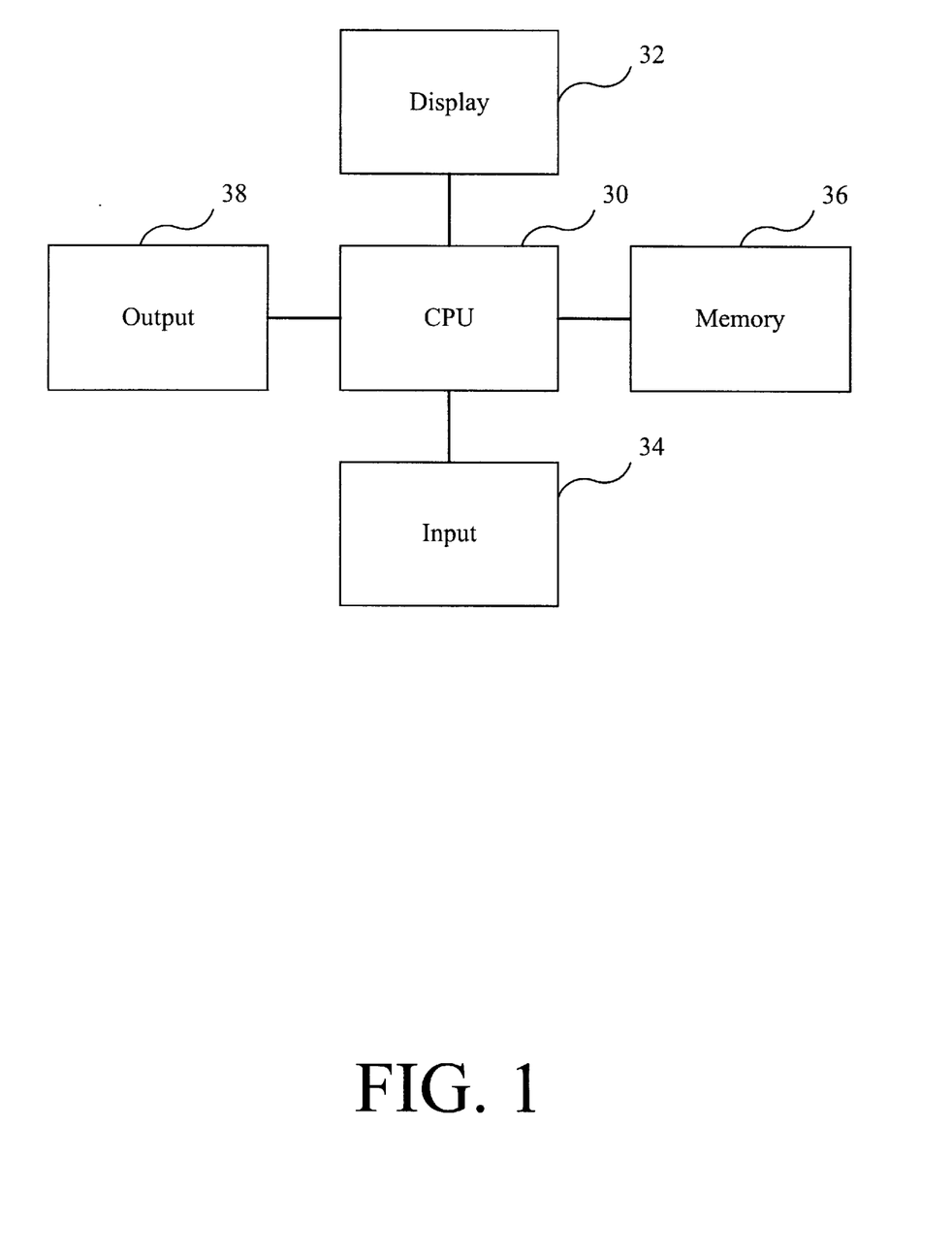
FIG. 1 is a simplified block diagram of a computer system for the present invention.

The present invention will be described below by way of a preferred embodiment as an improvement over the aforementioned speech synthesis systems, and implemented on an Apple Macintosh® (trademark of Apple Computer, Inc.) computer system. It is to be noted, however, that this invention can be implemented on other types of computers. Regardless of the manner in which the present invention is implemented, the basic operation of a computer system embodying the present invention, including the software and electronics which allow it to be performed, can be described with reference to the block diagram of FIG. 1, wherein numeral 30 indicates a central processing unit (CPU) which controls the overall operation of the computer system, numeral 32 indicates an optional standard display device such as a CRT or LCD, numeral 34 indicates an optional input device which may include both a standard keyboard and a pointer-controlling device such as a mouse, numeral 36 indicates a memory device which stores programs according to which the CPU 30 carries out various predefined tasks, and numeral 38 indicates an optional output device which may include a loudspeaker for playing the improved speech generated by the present invention.

Figure 2:
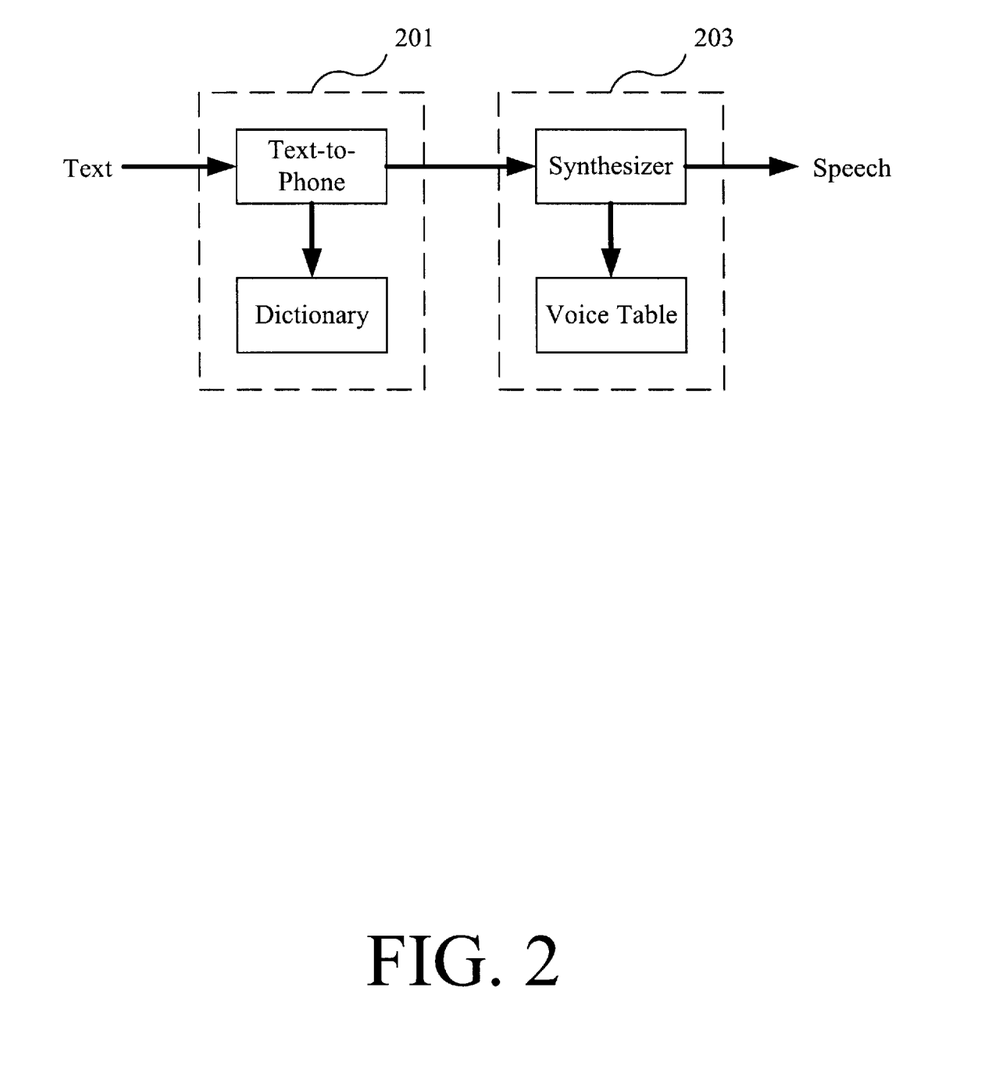
FIG. 2 is a simplified block diagram of a text-to-speech system.

Referring now to FIG. 2, a simplified functional block diagram of a text-to-speech system as used by the present invention can be seen. Text is input to block 201 which converts the text into phones via dictionary or table look-up function. To playout the phones associated with the text, the phones are input to the synthesizer of block 203 which synthesizer utilizes the voice table of block 203, which voice table may contain all needed phones or may only contain some of the needed phones and will then use aliases to other existing phones for any needed missing phones.

The present invention utilizes linguistic and phonetic knowledge of phones and diphones. Such speech sounds have acoustic and articulatory features which can be used to determine their degree of similarity to each other. The set of features used in the preferred embodiment of the present invention can be seen in Table 1 wherein each feature is listed (in no particular order) with its abbreviation (note that Appendix B lists a generalized definition, commonly accepted in the art of the present technology, for each feature in Table 1). Further, note that other feature sets could equally be used with the approach of the present invention. Still further, note that a list of the phones used in the preferred embodiment of the present invention are shown in Appendix A along with their associated features from the set of Table 1.

TABLE 1

| Feature | Abbreviation |
| --- | --- |
| Anterior | [ant] |
| Back | [bk] |
| Consonantal | [cons] |
| Continuant | [cont] |
| Coronal | [cor] |
| Diphthong | [dip] |
| High | [hi] |
| Low | [lo] |
| Nasal | [nas] |
| Rhotic | [rho] |
| Round | [rnd] |
| Sonorant | [son] |
| Stress | [str] |
| Strident | [stri] |
| Tense | [tns] |
| Voiced | [vd] |

Note further that the plus [+] and minus [−] binary values are commonly used in the art of the present invention to specify the presence or absence of a given attribute. Rather than have 2 separate labels, such as 'voiced' and 'voiceless,' it is possible to use the single label [vd] and simply indicate voiced as [+vd] and voiceless as [−vd]. In this way, natural oppositions can be established, and sets of sounds can be differentiated by the plus or minus value.

The features listed in Table 1 can thus be used to evaluate diphone sound alias candidates in order to determine which should be used for any given missing sound. However, the entire list of features shown in Table 1 does not need to be applied to each sound (further, as was mentioned above, with a different feature set, different features might apply to each sound). For example, the features [nas, ant, cor, stri, cont] only apply to consonantal sounds in a language. A similar restrictive list could be constructed for vowel-like sounds, etc. Thus, some features have particular relevance to the 'sound quality' of a missing diphone whereas other features may have no relevance at all.

Further, some features may be so central to the sound quality of a phone as to make them a virtual necessity in any diphone aliasing candidate. For example, the most salient features of the phone [s] are [+stri, −vd] and only three sounds in General American English have these features, namely [s], [f] and [SH]. Therefore, if a transition (diphone) between the phone [s] and another phone is missing, the most promising source for deriving that substituted (aliased) diphone sound is, firstly, another diphone of [s] to that other phone and, secondly, a diphone of either the phone [f] or the phone [SH] to that other phone.

Still further, the additional feature [cor] can be used to distinguish between [s] and [f] because the feature set for [s] is [+cons, −son, +ant, +cor, −vd, +cont, +stri] while the feature set for [f] is [+cons, −son, +ant, −cor, −vd, +cont, +stri]. And the additional feature [ant] can be used to distinguish between [s] and [SH] because the feature set for [s] is, again, [+cons, −son, +ant, +cor, −vd, +cont, +stri] while the feature set for [SH] is [+cons, −son, −ant, +hi, −vd, +cont, +stri].

If entire 'families' of diphones are missing, then a global structured approach is needed. For example, it may be the case that memory or storage limitations dictate that the phone [OR] must be aliased to other sounds, i.e., no original data is to be used for this sound. According to the list of features (again, see Table 1) for vowels, the phone [OR] is defined as [−cons, +son, +rho, −hi, +bk, +rnd]. Two vowel phones that share features with [OR] are [AR] and [IR]. Their features are as follows:

AR=[-cons, +son, +rho, -hi, +bk, -rnd]
IR=[-cons, +son, +rho, +hi, -bk, -rnd] and:
OR=[-cons, +son, +rho, -hi, +bk, +rnd].

Thus, it can be seen that the phone [OR] shares five features with the phone [AR] and three features with [IR]. Thus aliasing data from the phone [AR] for the phone [OR] in a missing diphone transition should yield generally better results.

However, the simple number of shared phone features is not sufficient to determine the most felicitous match for a missing diphone. This is because, as was earlier stated, some features have particular relevance to the 'sound' of the missing diphone. Therefore, in the present invention, for each missing diphone, there is a subset of phone features which must be met in their entirety before a candidate will even be considered for aliasing. Once the feature subset or threshold has been met, then the alias candidate with the greatest number of shared phone features can be used. In this way, not only does the resulting sound alias have the greatest possible number of phone features in common, the sound alias also includes the 'necessary' or particularly relevant features of the missing sound.

Thus, the approach of the present invention is to utilize a rule set based on a given set of phones and a given set of phone features. When providing an alias to a missing diphone in the present invention, first the missing diphone is broken down into its two halves or demi-diphones (again, a demi-diphone is generally equivalent to either the beginning half or ending half of a phone) so that the best available demi-diphone alias candidate for each half of the missing diphone can be found and aliased.

Then for each missing demi-diphone the rule set of the present invention stipulates a threshold subset of phone features which must exist between the phone comprising that demi-diphone and the phone comprising the demi-diphone alias candidate. Then (again, for each demi-diphone of the missing diphone) for each demi-diphone alias candidate which meets the threshold requirement, the demi-diphone alias candidate having the phone with the most phone features in common with the phone of the missing demi-diphone will be used as the alias demi-diphone. Further, if more than one candidate meets the threshold requirement and then ties for the most phone features in common, then any one of those tying candidates is equally viable as an alias.

The threshold determination rule set used in the preferred embodiment of the present invention, again based upon the given phones (along with their associated phone features) listed in Appendix A and the given phone features listed in Table 1, is as follows:

Threshold Determination:
1. For all vowel to vowel candidates, those phones considered for aliasing must, at a minimum, have the features [-cons, +son].
   1.1 For all r-colored vowel to r-colored vowel candidates, it is preferable that they share the additional feature [+rho].
   1.2 For all diphthong to diphthong candidates, it is preferable that they share the additional feature [+dip].
   1.3 For all diphthong to vowel candidates, and vice-versa, it is preferable that they share the additional features [+tns, +str].
2. For all vowel to semi-vowel (defined as [y], [w] and [h]) candidates, and vice-versa, those phones considered for aliasing must, at a minimum, have the features [-cons].
3. For all consonant to consonant candidates, those phones considered for aliasing must, at a minimum, have the features listed below by subgroup:
   3.1 Liquids (defined as [LX], [l] and [r]), must share all features except [ant].
   3.2 Nasals (defined as [m], [n] and [NG]), must share all features except [ant]. Note that the feature [voiced] is redundant for nasals, since [+nasal] implies [+vd] in General American English.
   3.3 Obstruents (defined as [b], [p], [PX], [d], [t], [TX], [DX], [g], [k] and [KX]), must share the features [+cons, -son, -cont].
   3.4 Fricatives (defined as [v], [f], [DH], [TH], [z], [s], [ZH] and [SH]), must share the features [+cons, -son, +cont].

The formalized aliasing approach of the present invention thus overcomes the ad hoc aliasing approach of the prior invention which oftentimes generated less than satisfactory speech synthesis sound output. Further, the structured approach of the present invention has applicability regardless of the reason a diphone is missing. Again, the present invention is useful when one is operating in a limited memory situation (and thus only storing a subset of the entire diphone table) or when one is merely lacking one or more diphones for some other reason.

While the formalized aliasing approach of the present invention has been shown to provide an improved speech synthesis system when needed diphones are missing, further aliasing possibilities exist outside of the structured rule set. For example, is possible in certain diphones to alias [h] to [SIL] and in certain other diphones to alias [LX] to [UH] or [UW].

A further innovation in the present invention is the novel use of facial imaging synchronized with synthetic speech output. As stated previously, in order to synchronize the phones to the visemes in a synthetic speech system, a mapping is made between the sound being generated and the image being displayed. This would generally require one viseme for each of the 40 or 50 phones. However, there is a similarity between certain sounds from a lip, teeth and tongue imaging viewpoint. Stated differently, because facial animation is only concerned with lip, teeth and tongue image positions, it is possible to disregard many of the other distinctive features which distinguish sounds.

For example, the distinctive features for the phone [k] are [+cons, -son, +hi, -ant, -cor, -cont, -vd] and the distinctive features for the phone [KX] are [+cons, -son, +hi, -ant, -cor, -cont, -tns]. The two sounds only differ by one feature (voiced versus tense). And neither voiced nor tense affect visible lip, teeth or tongue positioning. Similarly, the distinctive features for the phone [IH] are identical to those for the phone [IX], except for the value of the feature [str], which is positive for [IH] and negative for [IX], and which does not generally affect imaging of lip, teeth, or tongue. Therefore, one viseme could be used for [k] and [KX] while another viseme could be used for [IH] and [IX].

Another example occurs between the phone [m], which has the distinctive features [+cons, -son, +nas, +ant, -cor, +vd], and the phone [p], which has the distinctive features [+cons, -son, -hi, +ant, -cor, -cont, +vd]. Although [m] and [p] differ by three features [+nas, -hi, and -cont], articulatorily they are both bilabial sounds and thus they share the same imaging of lips, teeth and tongue positioning. As such, they are also good candidates for sharing a viseme. In this way, families of phones may be formed whereby one phone (herein referred to as an 'archiphone') could represent the entire phone family and where each family has its own viseme. Thus, [p], [PX], and [b], which are distinguished only by voicing, together with [m], which joins them on the basis of shared bilabiality, could form one archiphonic set and could have one associated viseme. In this way, all phones could be divided into groups (each represented by an archiphone which could be any phone in the group), each group thus associated with one viseme.

However, as has already been explained herein, phones have not been found to be the best approach in producing high-quality synthesized speech from concatenative units. This is, again, due to the unacceptably choppy speech caused by trying to recombine phones at the areas of most sensitive acoustic information. Instead, diphones (made up of portions of phones which have been combined at their areas of relative constancy) have been used in the prior art. This yielded a table of approximately 1800 diphone sample sounds for General American English.

Figure 4:
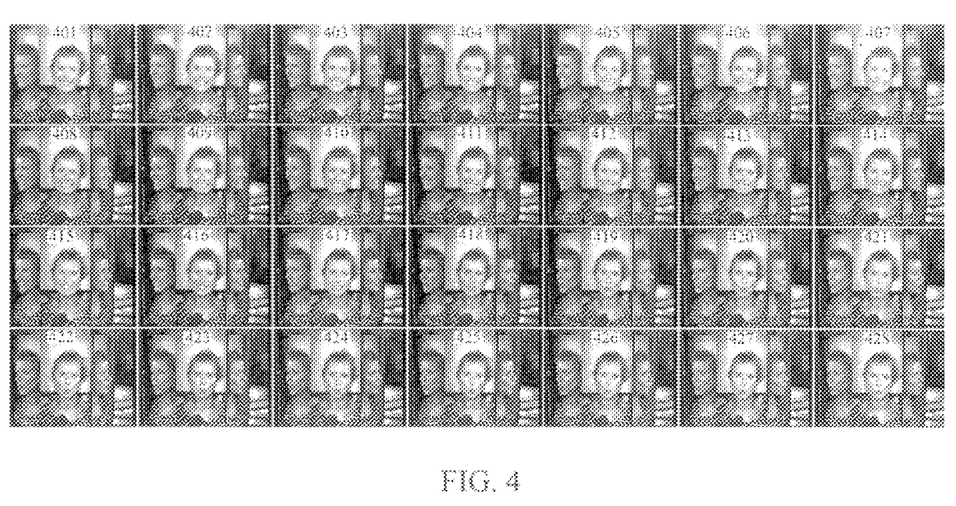
FIG. 4 depicts a diseme consisting of a sequence of 28 frames or images which transition from a viseme of the phone [IY] to a viseme of the phone [UW]
Figure 5:
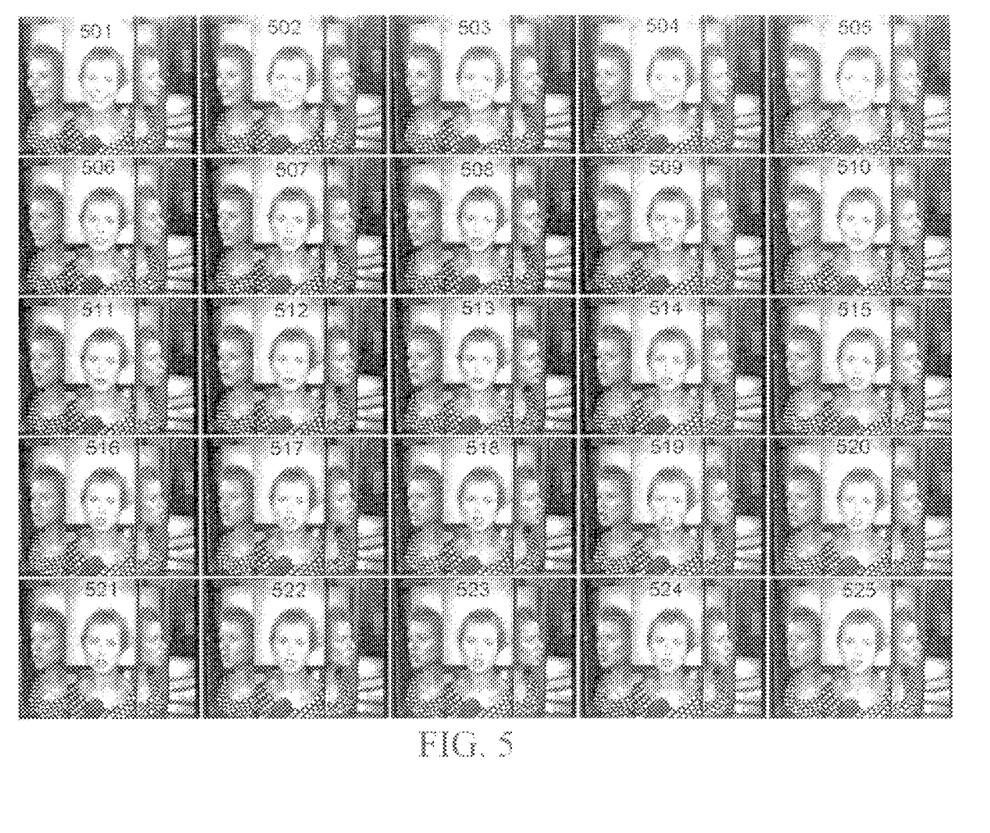
FIG. 5 depicts a diseme consisting of a sequence of 25 frames or images which transition from a viseme of the phone [TH] to a viseme of the phone [SH]
Figure 6:
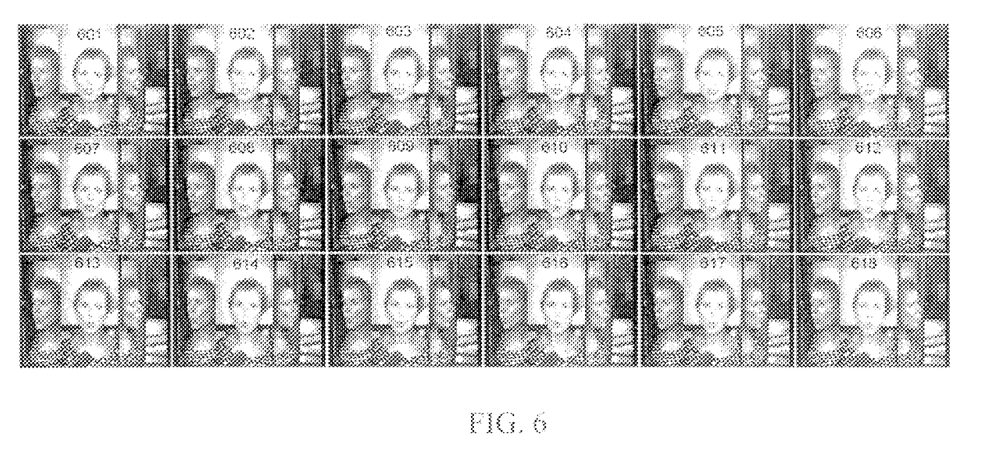
FIG. 6 depicts a diseme consisting of a sequence of 18 frames or images which transition from a viseme of the phone [TH] to a viseme of the phone [UW].

To map viseme images to a diphone would thus require the same 'transitioning' in that the imaging associated with a diphone would not be a static image, but rather, a series of images which dynamically depict, with lip, teeth and tongue positioning, the sound transition occurring in the relevant diphone. Each series of lip, teeth, and tongue positioning transitions is referred to herein as a 'diseme.' A diseme (like a diphone) thus begins somewhere during one viseme (phone) and ends somewhere during a following viseme (phone). Further, note that the transitioning which occurs in a diseme is generally not a linear function, but rather, depicts the varying rates of articulatory imaging which occur in a real human speaker. FIG. 4 depicts a diseme consisting of a sequence of 28 frames or images (denoted 401–428) which transition from a viseme of the phone [IY] to a viseme of the phone [UW]. FIG. 5 depicts a diseme consisting of a sequence of 25 frames or images (denoted 501–525) which transition from a viseme of the phone [TH] to a viseme of the phone [SH]. FIG. 6 depicts a diseme consisting of a sequence of 18 frames or images (denoted 601–618) which transition from a viseme of the phone [TH] to a viseme of the phone [UW].

In order to acquire and process the lip, teeth, and tongue articulation data which would correlate to the approximately 1800 diphones would seemingly require a very large set of diseme images, one diseme series of images for each diphone. However, as explained above, due to lip, teeth and tongue position imaging commonality, it is possible to group phones into archiphonic families. Therefore, it is possible to use a diseme, which depicts the transition from a phone in one archiphonic family to another phone in a different archiphonic family, for displaying the transition between any phone in the first archiphonic family to any phone in the second archiphonic family. In this way, many of the transitions which occur in the 1800 diphones could be visually depicted by the same diseme, again, due to their similarity in lip, teeth, and tongue image positioning.

To generate the disemes used to transition between the archiphonic families of diphones (the preferred embodiment of which are listed in Appendix C), it would seem that diseme transitions would have to be created from each archiphonic family to each other archiphonic family, including itself. However, it is not necessary in an animation sequence to store transitions from one phone in an archiphonic group to another phone which is a member of the same archiphonic group (basically, transitioning from one viseme to the same viseme). This is because such an image sequence would depict no change in lip, teeth, or tongue visual imaging. Therefore, all that needs to be generated is a diseme from each archiphonic group to each other archiphonic group.

Further, in the preferred embodiment of the present invention, no diseme transitions from any archiphonic group to the first archiphonic group (consisting of silence [SIL] and breath [BR]; see Appendix C) were recorded. Instead, in the preferred embodiment of the present invention, a transition to a neutral lip, teeth, tongue position (which correlates to the third archiphonic group) is used between sentences or during a pause in synthetic speech output, or a transition to a closed lip position (which correlates to the ninth archiphonic group) is used during a resting period as indicated by the end of a synthetic speech utterance or by some time-out function.

To create the disemes of the preferred embodiment of the present invention, first record a transition from the archiphone of the first archiphonic group (either [SIL] or [BR]) to the archiphone from each of the other 9 archiphonic groups. Then record a transition from the archiphone from each of the other 9 archiphonic groups to the archiphone of each of the remaining 8 archiphonic groups (again, because neither a transition within a group nor a transition to the first group is needed). Then record a transition from the archiphone from each of the other 8 archiphonic groups to the archiphone of each of the remaining 7 archiphonic groups, etc. Therefore, in the preferred embodiment of the present invention, the total number of disemes which should be generated is 9+(9×8)=81 disemes (each archiphonic transition of which is listed in Appendix C). In the preferred embodiment of the present invention, these disemes were video-recordings of a trained phonetician clearly showing the distinctive lip, teeth, and tongue transition.

These disemes could then be played back (using any known image interpolation method to transition from the end of one diseme to the beginning of a following diseme; note that this is not particularly difficult given that this transition is occuring during images of a relatively steady state) synchronized with diphone output by a synthetic speech system. The preferred embodiment of the present invention utilizes the disemes in the context of creating animated faces that speak with synthetic speech in Quick-Time™ (trademark of Apple Computer, Inc.) movies and in other animation techniques.

Note that if lesser image quality were acceptable to the user in a given environment, fewer similarities would be required in the archiphonic groupings. This would result in fewer archiphonic groups which would result in needing fewer diseme transition sequences between groups. Thus, less memory and/or processor capacity would be needed, albeit with lesser image transitioning quality. Likewise, if greater image quality were desired, the archiphonic groupings could be even further refined such that there was even greater similarity between phones. This would result in more archiphonic groups thus needing more diseme transition sequences with greater memory and processor requirements.

In the foregoing specification, the present invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

APPENDIX A

Distinctive feature matrices for phones in General American English Voice Table (note: +/− indicates presence or absence of the indicated feature in a given phone)

| | | |
|---|---|---|
| SIL | (silence/pause) | [+SIL] |
| BR | (breath) | [+BR] |
| IY | (beet) | [−cons, +son, +hi, −bk, +tns, +str] |
| IH | (bit) | [−cons, +son, +hi, −bk, −tns, +str] |
| IX | (roses) | [−cons, +son, +hi, −bk, −tns, −str] |
| EH | (bet) | [−cons, +son, −hi, −bk, −tns, +str] |
| AE | (bat) | [−cons, +son, −hi, −bk, −tns, +str] |
| AH | (bud) | [−cons, +son, −hi, +bk, −tns, +str] |
| AX | (about) | [−cons, +son, −hi, −bk, −tns, −str] |
| AA | (cot) | [−cons, +son, −hi, +bk, +tns, +str] |
| AO | (caught) | [−cons, +son, −hi, +rnd, +tns, +str] |
| UH | (book) | [−cons, +son, +hi, +bk, −tns, +str] |
| UW | (boot) | [−cons, +son, +hi, +bk, +tns, +str] |
| OW | (boat) | [−cons, +son, −hi, −lo, +bk, +str] |
| ER | (bird) | [−cons, +son, +rho, −hi, −bk, −rnd] |
| IR | (beer) | [−cons, +son, +rho, +hi, −bk, −rnd] |
| AR | (bar) | [−cons, +son, +rho, −hi, +bk, −rnd] |
| OR | (bore) | [−cons, +son, +rho, −hi, +bk, +rnd] |
| UR | (lure) | [−cons, +son, +rho, +hi, +bk, +rnd] |
| AY | (bite) | [−cons, +son, +dip, +hi, −bk] |
| EY | (bait) | [−cons, +son, +dip, −hi, −bk] |
| OY | (boy) | [−cons, +son, +dip, +hi, +bk] |
| AW | (bout) | [−cdns, +son, +dip, −hi, +bk] |
| LX | (help) | [+cons, +son, −nas, −ant, +cor, +vd] |
| l | (limb) | [+cons, +son, −nas, +ant, +cor, +vd] |
| m | (mat) | [+cons, −son, +nas, +ant, −cor] |
| n | (nat) | [+cons, −son, +nas, +ant, +cor] |
| NG | (bang) | [+cons, −son, +nas, −ant, −cor] |
| y | (yet) | [−cons, −son, +hi, −ant, −cor, +vd] |
| r | (ran) | [+cons, +son, −hi, −ant, +cor, +vd] |
| w | (wet) | [−cons, −son, +hi, +rnd, −ant, −cor, +vd] |
| b | (bin) | [+cons, −son, −hi, +ant, −cor, −cont, +vd] |
| p | (pin) | [+cons, −son, −hi, +ant, −cor, −cont, −vd] |
| PX | (spin) | [+cons, −son, −hi, +ant, −cor, −cont, −tns] |
| d | (din) | [+cons, −son, −hi, +ant, +cor, −cont, +vd] |
| t | (tin) | [+cons, −son, −hi, +ant, +cor, −cont, −vd] |
| TX | (sting) | [+cons, −son, −hi, +ant, +cor, −cont, −tns] |
| DX | (butter) | [+cons, −son, −hi, +ant, +cor, −cont, +tns] |
| g | (gain) | [+cons, −son, +hi, −ant, −cor, −cont, +vd] |
| k | (kin) | [+cons, −son, +hi, −ant, −cor, −cont, −vd] |
| KX | (skin) | [+cons, −son, +hi, −ant, −cor, −cont, −tns] |
| v | (van) | [+cons, −son, +ant, −cor, +vd, +cont, +stri] |
| f | (fin) | [+cons, −son, +ant, −cor, −vd, +cont, +stri] |
| DH | (than) | [+cons, −son, +ant, +cor, +vd, +cont, −stri] |
| TH | (thin) | [+cons, −son, +ant, −cor, −vd, +cont, −stri] |
| z | (zen) | [+cons, −son, +ant, +cor, +vd, +cont, +stri] |
| s | (sin) | [+cons, −son, +ant, +cor, −vd, +cont, +stri] |
| ZH | (genre) | [+cons, −son, −ant, +hi, +vd, +cont, +stri] |
| SH | (shin) | [+cons, −son, −ant, +hi, −vd, +cont, +stri] |
| h | (hit) | [−cons, −son, −ant, −cor, −vd, +cont, −stri] |

APPENDIX B

Most of the following definitions for the features used in the preferred embodiment of the present invention are taken from *The Sound Pattern of English* by Noam Chomsky and Morris Halle, New York, Harper and Row, 1968 (hereinafter "CHOMSKY AND HALLE"). Where other features than those defined by CHOMSKY AND HALLE are used, definitions are based on those given in *A Course in Phonetics* by Peter Ladefoged, New York, Harcourt, Brace, Jovanovich, 1982, Second Edition (hereinafter "LADEFOGED"). Direct definitions from these authors are indicated by quotation marks.

The features [SIL] and [BR] are ad hoc quasi-features, since neither silence nor breath is an articulated, distinctive, speech sound. Silence may of course be aliased to itself under all conditions, and the same holds true for Breath.

Anterior: "Anterior sounds are produced with an obstruction located in front of the palato-alveolar region of the mouth; nonanterior sounds are produced without such an obstruction. The palato-alveolar region is that where the ordinary English [S] is produced." This feature divides sounds into those made at the front of the mouth, such as [p,t], as opposed to those made farther back, such as [k].

Back: "Back sounds are produced by retracting the tongue body from the neutral position; nonback sounds are produced without such a retraction from the neutral position."

Consonantal: "Consonantal sounds are produced with a radical obstruction in the midsagittal region [the midline] of the vocal tract; nonconsonantal sounds are produced without such an obstruction."

Continuant: "In the production of continuant sounds, the primary constriction in the (vocal) tract is not narrowed to the point where the air flow past the constriction is blocked; in stops the air flow through the mouth is effectively blocked." Using a CHOMSKY AND HALLE feature system, only stops and nasals are [−continuant].

Coronal : "Coronal sounds are produced with the blade of the tongue raised from its neutral position; noncoronal sounds are produced with the blade of the tongue in the neutral position."

Diphthong: This feature is not a traditional one, since it is a 'bridge feature' over two vowel sounds. A dipthong is described by LADEFOGED as "a vowel in which there is a change in quality during a single syllable, as in English [AY] in 'high'." It is useful in the methodology of aliasing because it enables diphthongs to be aliased primarily to diphthongs, rather than to simple (pure) vowels, and vice versa.

High: "High sounds are produced by raising the body of the tongue above the level that it occupies in the neutral position; nonhigh sounds are produced without such a raising of the tongue body."

Low: "Low sounds are produced by lowering the body of the tongue below the level that it occupies in the neutral position; nonlow sounds are produced without such a lowering of the body of the tongue."

Nasal: "Nasal sounds are produced with a lowered velum which allows the air to escape through the nose; nonnasal sounds are produced with a raised velum so that the air from the lungs can escape only through the mouth."

Rhotic: This feature is not used by CHOMSKY AND HALLE, but is used in the preferred embodiment of the present invention to distinguish between two groups of vowels. Rhotic sounds are those in which /r/ can occur after a vowel and within a syllable, such as in 'bird, far, early.'

Round: "Rounded sounds are produced with a narrowing of the lip orifice; non-rounded sounds are produced without such a narrowing." In certain varieties of English, this feature is not needed, since it has the same value as the feature Back, [+back] vowels being [+round], and [−back] vowels [−round]. Therefore if [+round] is attached to a vowel, it implies it is also [+back].

Sonorant "Sonorants are sounds produced with a vocal tract cavity configuration in which spontaneous voicing is possible . . . " These sounds include vowels, semivowels, nasals and laterals.

The combined use of these two features ([cons] and [son]) effectively separates consonants from vowels, and vowels from semi-vowels.

Stress: This feature is not a traditional one, since it is not possible to determine a unique articulatory or acoustic correlate for the perceptual phenomenon of stress. Stress is described by LADEFOGED as "the use of extra respiratory effort during a syllable."

a position such that they will vibrate if there is an appropriate airstream. Nonvoiced sounds are those in which the glottal opening is so wide that there can be no vibration."

APPENDIX C

| ARCHIPHONIC FAMILY GROUP (archiphone in italics; n = 50) | ARTICULATORY/VISIBLE FEATURE (n = 10) |
|---|---|
| 1. *SIL*, BR | Silence, Breath |
| 2. *IY*, IH, IX, IR, y | Lips spreading |
| 3. *EH*, AE, EY, AH, AX, ER, UH, h | Lips neutral |
| 4. *AA*, AO, AR, AY, AW | Lips open |
| 5. *UW*, UR, OW, OY, OR, w | Lips rounded |
| 6. *f*, v | Upper teeth on retracted lower lip |
| 7. *TH*, DH | Tongue tip between teeth |
| 8. *SH*, ZH | Lips rounded and protruded |
| 9. *b*, p, PX, m | Lips together |
| 10. *d*, t, TX, DX, n, l, s, z, r, k, KX, g, LX, NG | Tongue blade/body involvement |

DISEME ARCHIPHONIC TRANSITIONS

| | | | | | | | | | |
|---|---|---|---|---|---|---|---|---|---|
| 1. | SIL-IY | 2. | SIL-EH | 3. | SIL-AA | 4. | SIL-UW | 5. | SIL-f |
| 6. | SIL-TH | 7. | SIL-SH | 8. | SIL-b | 9. | SIL-d | 10. | IY-EH |
| 11. | IY-AA | 12. | IY-UW | 13. | IY-f | 14. | IY-TH | 15. | IY-SH |
| 16. | IY-b | 17. | IY-d | 18. | EH-IY | 19. | EH-AA | 20. | EH-UW |
| 21. | EH-f | 22. | EH-TH | 23. | EH-SH | 24. | EH-b | 25. | EH-d |
| 26. | AA-IY | 27. | AA-EH | 28. | AA-UW | 29. | AA-f | 30. | AA-TH |
| 31. | AA-SH | 32. | AA-b | 33. | AA-d | 34. | UW-IY | 35. | UW-EH |
| 36. | UW-AA | 37. | UW-f | 38. | UW-TH | 39. | UW-SH | 40. | UW-b |
| 41. | UW-d | 42. | f-IY | 43. | f-EH | 44. | f-AA | 45. | f-UW |
| 46. | f-TH | 47. | f-SH | 48. | f-b | 49. | f-d | 50. | TH-IY |
| 51. | TH-EH | 52. | TH-AA | 53. | TH-UW | 54. | TH-f | 55. | TH-SH |
| 56. | TH-b | 57. | TH-d | 58. | SH-IY | 59. | SH-EH | 60. | SH-AA |
| 61. | SH-UW | 62. | SH-f | 63. | SH-TH | 64. | SH-b | 65. | SH-d |
| 66. | b-IY | 67. | b-EH | 68. | b-AA | 69. | b-UW | 70. | b-f |
| 71. | b-TH | 72. | b-SH | 73. | b-d | 74. | d-IY | 75. | d-EH |
| 76. | d-AA | 77. | d-UW | 78. | d-f | 79. | d-TH | 80. | d-SH |
| 81. | d-b | | | | | | | | |

Strident: "Strident sounds are marked acoustically by greater noisiness than their nonstrident counterparts." In practice, for English, this means that the fricatives [s, z, f, v] are [+strident] while all other sounds are [−strident].

Tense: "[This feature] specifies the manner in which the entire articulatory gesture of a given sound is executed by the supraglottal musculature. Tense sounds are produced with a deliberate, accurate, maximally distinct gesture that involves considerable muscular effort; nontense sounds are produced rapidly and somewhat indistinctly. In tense sounds, both vowels and consonants, the period during which the articulatory organs maintain the appropriate configuration is relatively long, while in nontense sounds the entire gesture is executed in a somewhat superficial manner."

In practice, this feature is used to distinguish between two groups of vowels, and between aspirated and unaspirated stops. Among the stops, those with aspiration are considered [+tense], and the unaspirated ones are [−tense]. Note that when the feature [tense] is used for a consonant in English, the feature [voiced] becomes redundant, since all [−tense] consonants are also [−voiced]; also note that all r-colored vowels and all diphthongs are [+tns], and it is therefore redundant to list this feature when either [+dip] or [+rho] are listed in the matrix.

Voiced The definition provided by CHOMSKY AND HALLE for this feature is somewhat complex. LADEFOGED provides the following interpretation: ". . . voiced sounds are defined as those in which the vocal cords are in

What is claimed is:

1. A method for synchronizing facial images to synthetic speech comprising:
   a) storing a sequence of facial images from a viseme in a first archiphonic group to a viseme in a second archiphonic group;
   b) displaying the sequence of facial images from the viseme in the first archiphonic group to the viseme in the second archiphonic group if a phone from the first archiphonic group is followed by a phone from the second archiphonic group in the synthetic speech.

2. An apparatus for synchronizing facial images to synthetic speech comprising:
   a) means for storing a sequence of facial images from a viseme in a first archiphonic group to a viseme in a second archiphonic group;
   b) means for displaying the sequence of facial images from the viseme in the first archiphonic group to the viseme in the second archiphonic group if a phone from the first archiphonic group is followed by a phone from the second archiphonic group in the synthetic speech.

3. A method for synchronizing facial images to synthetic speech in an electronic system wherein the synthetic speech can be divided into a set of phonemes comprising distinctive phonetic features and wherein each of the phonemes of the set of phonemes has associated with it a viseme comprising an image of visible articulatory facial features, said method comprising:
   a) dividing the phonemes of the set of phonemes into multiple families according to the distinctive phonetic features of the phonemes of the set of phonemes;

b) designating one phonemes of each of the multiple families as an archiphone for that family;

c) storing a diseme comprising a sequence of images beginning with the viseme of the archiphone of 1 of the multiple families and ending with the viseme of the archiphone of one of the other of the multiple families;

d) displaying the stored diseme if in the synthetic speech any phonemes from the one of the multiple families is followed by any phonemes from the one of the other of the multiple families.

4. The system for synchronizing facial images to synthetic speech in an electronic system wherein the synthetic speech can be divided into a set of phonemes comprising distinctive phonetic features and wherein each of the phonemes of the set of phonemes has associated with it a viseme comprising an image of visible articulatory facial features, said apparatus comprising:

a) means for dividing the phonemes of the set of phonemes into multiple families according to the distinctive phonetic features of the phonemes of the set of phonemes;

b) means for designating one phony of each of the multiple families as an archiphone for that family;

c) means for storing a diseme comprising a sequence of images beginning with the viseme of the archiphone of one of the multiple families and ending with the viseme of the archiphone of one of the other of the multiple families;

d) means for displaying be stored diseme if in the synthetic speech any phonemes from the one of the multiple families is followed by any phonemes from the one of the other of the multiple families.

5. A method for synchronizing facial images to synthetic speech comprising:

a) storing a sequence of facial images from a first viseme to a second viseme; and b) displaying the sequence of facial image from the first viseme to the second viseme if a first phone is followed by a second phone in the synthetic speech.

6. The method according to claim 5 wherein the first viseme is an element in a first archiphonic group and the second viseme is an element in a second archiphonic group.

7. The method according to claim 5 wherein the first phone is an element in a first archiphonic group and the second phone is an element in a second archiphonic group.

8. A computer-readable medium comprising program instructions for the synchronizing of facial images to synthetic speech by performing the steps of:

a) storing a sequence of facial images from a viseme in a first archiphonic group to a viseme in a second archiphonic group; and b) displaying the sequence of facial images from the viseme in the first archiphonic group to the viseme in the second archiphonic group if a phone from the first archiphonic group is followed by a phone from the second archiphonic group in the synthetic speech.

* * * * *